(12) United States Patent
Zhai

(10) Patent No.: US 8,705,390 B2
(45) Date of Patent: Apr. 22, 2014

(54) TECHNIQUES FOR MONITORING THE QUALITY OF SHORT-RANGE WIRELESS LINKS

(75) Inventor: Hongqiang Zhai, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 265 days.

(21) Appl. No.: 13/055,157

(22) PCT Filed: Jul. 8, 2009

(86) PCT No.: PCT/IB2009/052972
§ 371 (c)(1),
(2), (4) Date: Jan. 21, 2011

(87) PCT Pub. No.: WO2010/013150
PCT Pub. Date: Feb. 4, 2010

(65) Prior Publication Data
US 2011/0128881 A1    Jun. 2, 2011

Related U.S. Application Data

(60) Provisional application No. 61/084,062, filed on Jul. 28, 2008, provisional application No. 61/183,096, filed on Jun. 2, 2009.

(51) Int. Cl.
*H04L 12/26* (2006.01)

(52) U.S. Cl.
USPC .......................................... 370/252; 370/236

(58) Field of Classification Search
USPC .......................... 370/252, 236, 328, 329, 338
See application file for complete search history.

(56) References Cited

U.S. PATENT DOCUMENTS

| | | | |
|---|---|---|---|
| 5,960,350 A | 9/1999 | Schorman | |
| 7,394,807 B2 * | 7/2008 | Hamiti et al. | 370/389 |
| 8,233,463 B2 * | 7/2012 | Yang | 370/338 |
| 2002/0160781 A1 * | 10/2002 | Bark et al. | 455/450 |
| 2005/0068970 A1 * | 3/2005 | Srikrishna et al. | 370/400 |
| 2008/0080436 A1 * | 4/2008 | Sandhu et al. | 370/338 |
| 2008/0186867 A1 * | 8/2008 | Schoo et al. | 370/252 |
| 2008/0205420 A1 * | 8/2008 | Srikrishna et al. | 370/401 |
| 2008/0261535 A1 * | 10/2008 | Weil et al. | 455/67.11 |
| 2009/0147709 A1 * | 6/2009 | Muqattash et al. | 370/310 |
| 2009/0147723 A1 * | 6/2009 | Fang et al. | 370/315 |
| 2009/0213771 A1 * | 8/2009 | Celentano et al. | 370/310 |

FOREIGN PATENT DOCUMENTS

EP        1447921 A1    8/2004

* cited by examiner

*Primary Examiner* — Brian D Nguyen
(74) *Attorney, Agent, or Firm* — Larry Liberchuk

(57) ABSTRACT

A method for monitoring of a wireless link quality comprises measuring the link quality of a wireless link (120-XY) between a beacon device (110-X) transmitting a beacon and a beacon device (110-Y) receiving the beacon, wherein the measuring is performed by the receiving device (S320); saving link quality measures in a local neighborhood link quality (LNLQ) table (400) maintained by the receiving device (110-Y) (S330); and advertising the link quality measures of wireless links by transmitting the measures in beacons (S340).

7 Claims, 4 Drawing Sheets

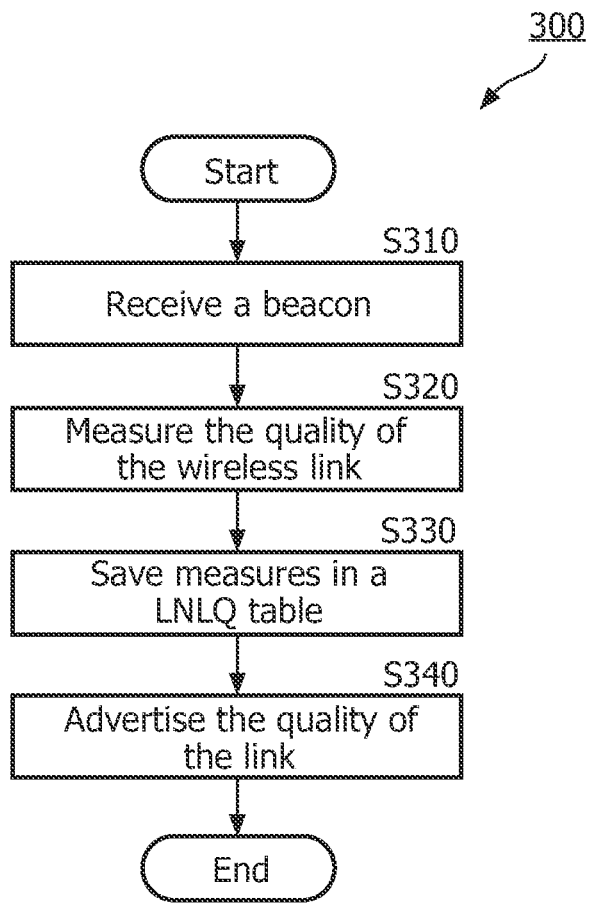

TECHNIQUES FOR MONITORING THE QUALITY OF SHORT-RANGE WIRELESS LINKS

This application claims the benefit of U.S. Provisional Application No. 61/084,062 filed on Jul. 28, 2008.

The invention generally relates to monitoring of wireless links in wireless networks.

A wireless network includes a collection of devices communicating with each other over a wireless medium. An exemplary diagram of a wireless network 100 including seven devices 110-1 through 110-7 is shown in FIG. 1. Each device 110-X (X is an integer equal to or greater than 1) sends and receives signals from a neighboring device 110-Y (Y is an integer equal to or greater than 1) over a wireless link 120-XY. In the field of telecommunication many different type of wireless networks are defined. One example is a wireless personal area network (WPAN) which is a type of a wireless network that interconnects devices within a relatively small area. The wireless network operates according to a communication standard, which governs rules with regard to transmission and reception of signals. The ultra-wideband (UWB) WiMedia is an example of a communication standard being utilized in WPANs. Some of the devices 110-X are beaconing devices which transmit beacons periodically.

The quality of a wireless link 120-XY dynamically changes according to environmental conditions and could be significantly degraded if moving objects are around the link. For example, people walking or standing in the line-of-sight between two devices 110-X and 110-Y would reduce the quality of the wireless link 120-XY. The quality of a wireless link 120-XY is defined, for example, as the estimated signal-to-noise ratio (SNR).

Information about the quality of a link is very useful in improving the wireless network performance. Such information can be utilized for a better device selection, link adaptation, and route selection/re-selection. As the quality of the link is not a static measure, there is a need to monitor the link continuously or whenever quality information is required.

The current version of the WiMedia specifications (e.g., version 1.0 and 1.2) calls for a Link Feedback information element (IE) to monitor the link quality. This IE is transmitted by a receiver (e.g., a device 110-X) to recommend a data rate and a transmit power level to a transmitter (e.g., a device 110-Y). The transmitter cannot determine the conditions of outgoing links (e.g., link 120-YX) based on the Link Feedback IE. In addition, a transmitter cannot specify link quality information that should be included in the Link Feedback IE transmitted by the receiver.

Therefore, it would be advantageous to provide an efficient solution for monitoring the quality of wireless links between neighboring devices in a wireless network.

Certain embodiments of the invention include a method for continuous monitoring of a wireless link quality. The method comprises measuring the link quality of a wireless link between a beacon device transmitting a beacon and a beacon device receiving the beacon, wherein the measuring is performed by the receiving device; and advertising the link quality measures of wireless links between the receiving device and its neighbor devices, wherein the link quality measures may be recorded in a neighborhood link quality table by transmitting the measures in beacons.

Certain embodiments of the invention also include a method for on-demand monitoring of a wireless link quality. The method comprises broadcasting by an initiating device a link quality monitoring command including at least a link quality information element (LQIE); waiting a predefined amount of time; performing a check to determine if at least one device responded to the link quality monitoring command with its LQIE; and further including in certain embodiments saving link quality measures designated in each received LQIE in a neighborhood link quality table of the initiating device.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 3 is a flowchart describing the method for continuous monitoring of a wireless link quality in accordance with an embodiment of the invention.

FIG. 4 is a schematic diagram of a local neighborhood link quality (LNLQ) table in accordance with an embodiment of the invention.

Figure 1:
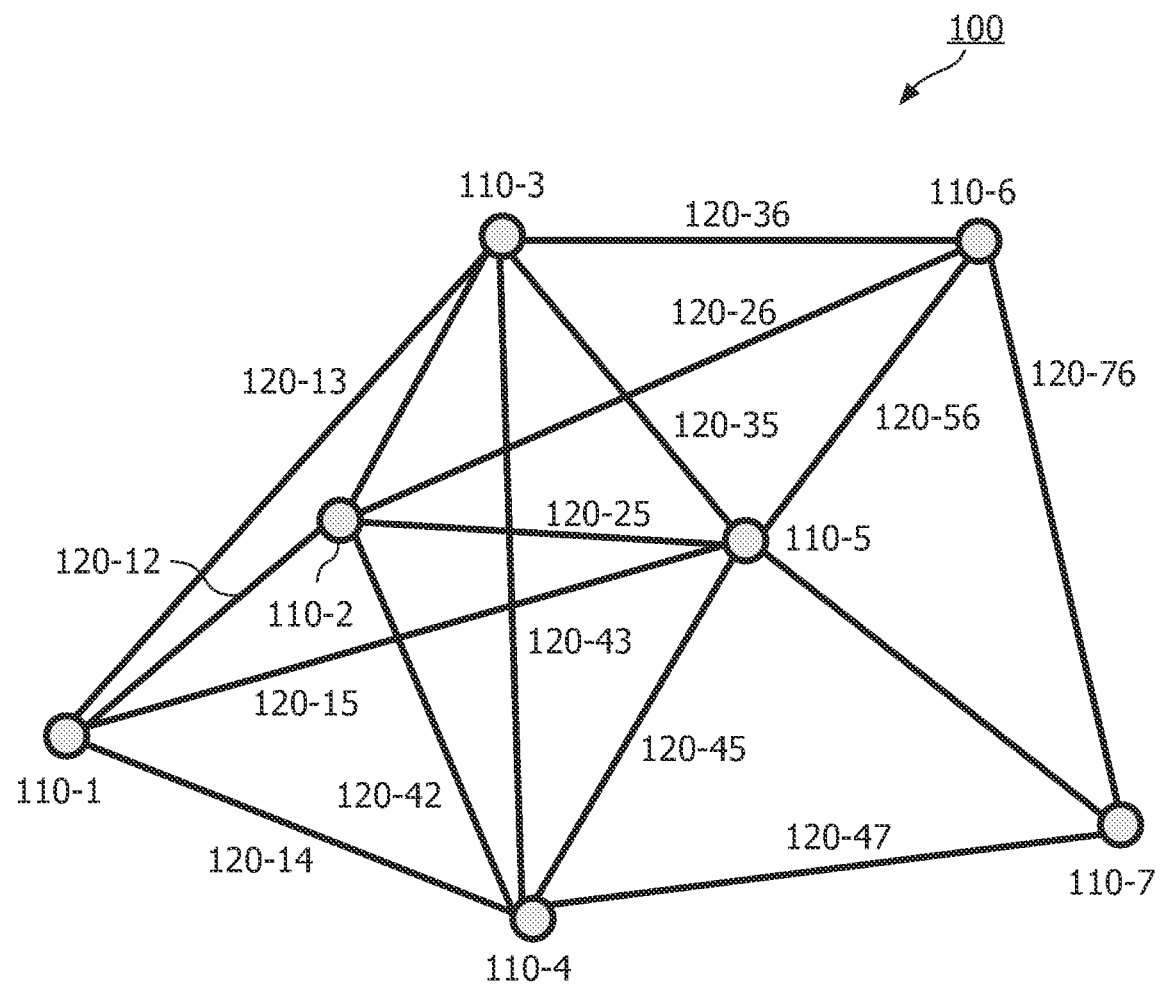
FIG. 1 is a schematic diagram of a wireless network.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The invention provides techniques and data structures enabling each device in a wireless network to monitor the quality of wireless links with its neighboring devices. Specifically, a link quality information element (hereinafter "LQIE") and a link quality monitoring command frame are defined. Each device periodically or aperiodically broadcasts the LQIE by piggybacking this element in beacon frames or transmitting the LQIE in separate frames. Each device records all the link quality information transmitted by its neighbors and constructs a local neighborhood link quality table (hereinafter "LNLQ" table). In accordance with certain embodiments of the invention, information in the link quality table can be utilized to facilitate link adaptation, device selection, route selection/re-selection, and so on.

Figure 2A:
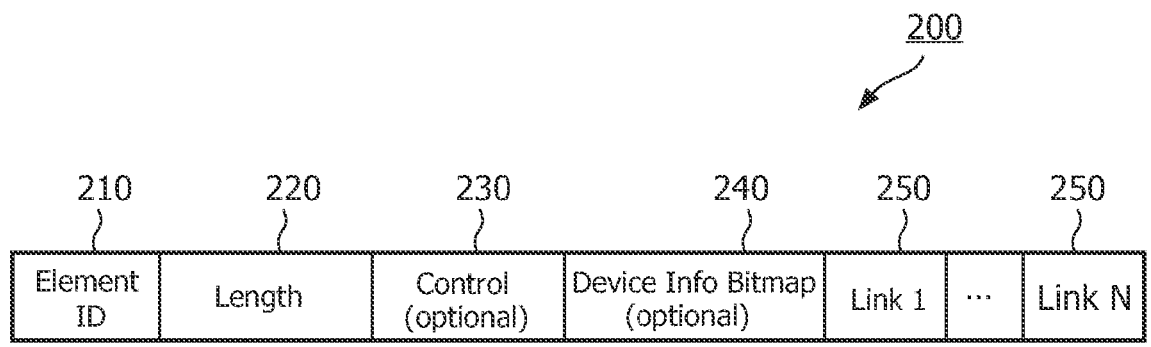
FIG. 2A is a schematic diagram illustrating a structure of a link quality information element (LQIE) constructed in accordance with an embodiment of the invention.

FIG. 2A shows an exemplary and non-limiting diagram illustrating the structure of a LQIE 200 in accordance with an embodiment of the invention. The LQIE 200 includes the following fields: an element ID 210, a length 220, a control 230, a device information bitmap 240, and a number of N link fields (collectively referred to as link fields 250). The length field 220 includes the total size (i.e., number of bytes) of the fields 230, 240, and 250.

The control field 230 is one byte of information that indicates the type of monitoring method (i.e., on-demand or continuous) to be used, type of measure of the links (e.g., quality, data rate, power level, etc.) and where addresses of neighboring devices are designated (i.e., in the links fields 250 or in the device information bitmap field 240). The control field 230 also indicates the type of the on-demand monitoring method, which maybe either a monitoring response or a monitoring request. An exemplary and non-limiting format of the control field 230 is provided in Table 1.

TABLE 1

| Bits | Value | Description |
|---|---|---|
| $b_1b_0$ | 00 | Type 0: Quality of links. Device addresses are indicated by the Device Info Bitmap field |
| $b_1b_0$ | 01 | Type 1: Rate/Power of links. Device addresses are indicated by the Device Info Bitmap field |
| $b_1b_0$ | 10 | Type 2: Quality of links. Device addresses are indicated in the Link field |
| $b_1b_0$ | 11 | Type 3: Rate/Power of links. Device addresses are indicated in the Link field |
| $b_7$ | 0 | continuous monitoring |
| $b_7$ | 1 | On-demand monitoring |
| $b_7b_6$ | 11 | Monitoring request |
| $b_7b_6$ | 10 | Monitoring response |

In some embodiments the control field 230 and/or the device information bitmap field 240 are optional. If the control field 230 is not included in the LQIE 200, then four different elements IDs 210 are required to represent the four types of operations listed in Table 1. The device information bitmap field 240 includes K (where K is an integer) bit elements. A bit element T corresponds to a device 'i'. If a bit element i's value is '1', there is a link field corresponding to the device 'I'; otherwise, there is no link field for the device 'i'. The link fields 250 are included in order of the elements listed in the device information bitmap field 240.

The link fields 250 include the quality of measures of wireless links that a device connects to. As an example, for a device 110-1, four link fields are used in the LQIE 200 to include quality measures of the wireless links 120-12; 120-3; 120-14; and 120-15. The measures may include one or more of link quality information, a data rate, and a transmit power level.

Figure 2B:
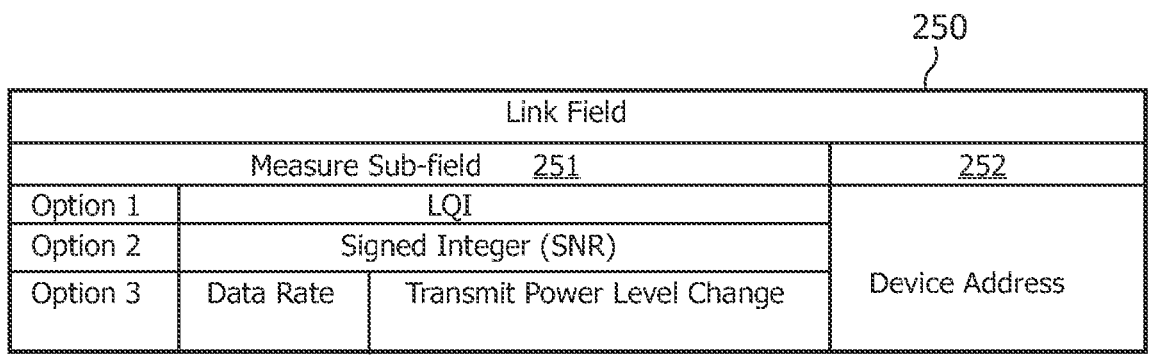
FIG. 2B is a schematic diagram illustrating a structure of a link field of the LQIE.

An exemplary and non-limiting diagram illustrating the format of a link field 250 is shown in FIG. 2B. The link field 250 includes a measure sub-field 251 and a device address sub-field 252. The measure sub-field 251 holds a link quality indication (LQI) and a signed-integer value. Optionally, the sub-field 251 also includes a measure data rate value and a transmit power level change value. The LQI designates the link quality estimate (LQE) and could be either a negative or a positive integer. The signed-integer is a predefined system parameter, which may be, for example, 1 dB, or 0.1 dB, or any other value. The device address sub-field 252 includes the address of a neighboring device of the respective wireless link. The sub-field 252 is optional and included in the link field 250 only if the devices' addresses are not designated in the device information bitmap field 240.

In accordance with an embodiment of the invention the LQI can be reused if the LQE value is between −6 db and 24 db. A non-limiting example for reusing the LQI values is provided in Table 2.

TABLE 2

| LQI Values | Description |
|---|---|
| 0000 0000 | Not support reporting link quality, or the link quality is less than −6 dB |
| 0000 0001–0001 1111 | SNR = (LQE + 7) dB |
| 0010 0000–0111 1111 | Reserved |
| 1000 0000–1111 1111 | Vendor specific encoding |

A link quality monitoring command frame, in accordance with an exemplary embodiment of the invention, is a medium access control (MAC) frame which typically includes a header, a payload data, and a frame check sequence. The frame type (usually designated in the header) indicates that it is a command frame. The frame subtype indicates that the MAC frame is the link quality monitoring command frame. The MAC frame's payload data includes the LQIE 200. As mentioned above, the type of the on-demand monitoring method is indicated in the control field 230. If the control field 230 is not part of the LQIE 200, then a reserved bit in the MAC frame or in the LQIE 200 can be used to designate between the two types of monitoring methods.

FIG. 3 shows an exemplary and non-limiting flowchart 300 describing the method for continuous monitoring of a wireless link quality implemented in accordance with an embodiment of the invention. The continuous monitoring process is typically performed by a beaconing device. The method will be described with a reference to a specific example, where a wireless link 120-XY between a device 110-X and a device 110-Y is being monitored, both devices are beaconing devices. However, the method can be utilized to perform continuous monitoring of wireless links of any number of neighboring devices in a wireless network.

At S310 the device 110-Y receives a beacon transmitted by the device 110-X. Subsequently, at S320, the device 110-Y measures the quality of the wireless link 120-XY between the two devices. The measures may include, but are not limited to, a signal-to-noise ratio, a data rate, and a received signal strength indicator (RSSI). At S330, the measures are saved in a LNLQ table 400 schematically shown in FIG. 4. A LNLQ table 400 includes a device address field 410 designating the addresses of the receiving and transmitting devices and a link quality measures field 420. The address of the transmitting device (e.g., device 110-X) is recorded in the "From" sub-field 412, while the address of the receiving device (e.g., device 110-Y) is saved in the "To" sub-field 414. It should be noted that the LNLQ table 400 includes entries for all the wireless links that the device 110-Y has with its neighboring devices.

At S340 the device 110-Y advertises the quality of wireless links recorded in the LNLQ table by transmitting a LQIE 200 in its beacons. The LQIE 200 is constructed to include the addresses of all devices listed in the "From" sub-field 412 and the link fields 250 of the LQIE 200 includes quality measures of the respective wireless links.

When a device (e.g., a device 110-Z, Z is an integer equal or greater than 1) receives a beacon including the LQIE 200, the device 110-Z modifies its own LNLQ table accordingly. Specifically, the "To" sub-field is updated with the address of the beacon transmitting device (e.g., device 110-Y) and the "From" sub-field is changed to include the addresses of devices listed in the LQIE 200. In one embodiment of the invention the link quality measures field 420 may include either the newest information in the received LQIE or an averaged value computed, for example, using an exponential average algorithm.

In accordance with an embodiment of the invention, when the quality of all incoming links of a device does not change, a device may not transmit a LQIE in its beacons for a predefined period of time. However, the device may be required to advertise the link quality information at least once during a period of time "$T_{qupdate}$". The value of the variable $T_{qupdate}$ is preconfigured and may be set to a fixed value or computed using random distributions. When the quality of an incoming link of a device changes, the device advertises the changed link quality information to all its neighbors during time "$T_{qchange}$" intervals. The value of the variable $T_{qchange}$ is preconfigured and may be set to a fixed value or computed using random distributions. It should be appreciated that the variables $T_{qchange}$ and $T_{qupdate}$ enable the performance of periodic or aperiodic monitoring.

Figure 5:
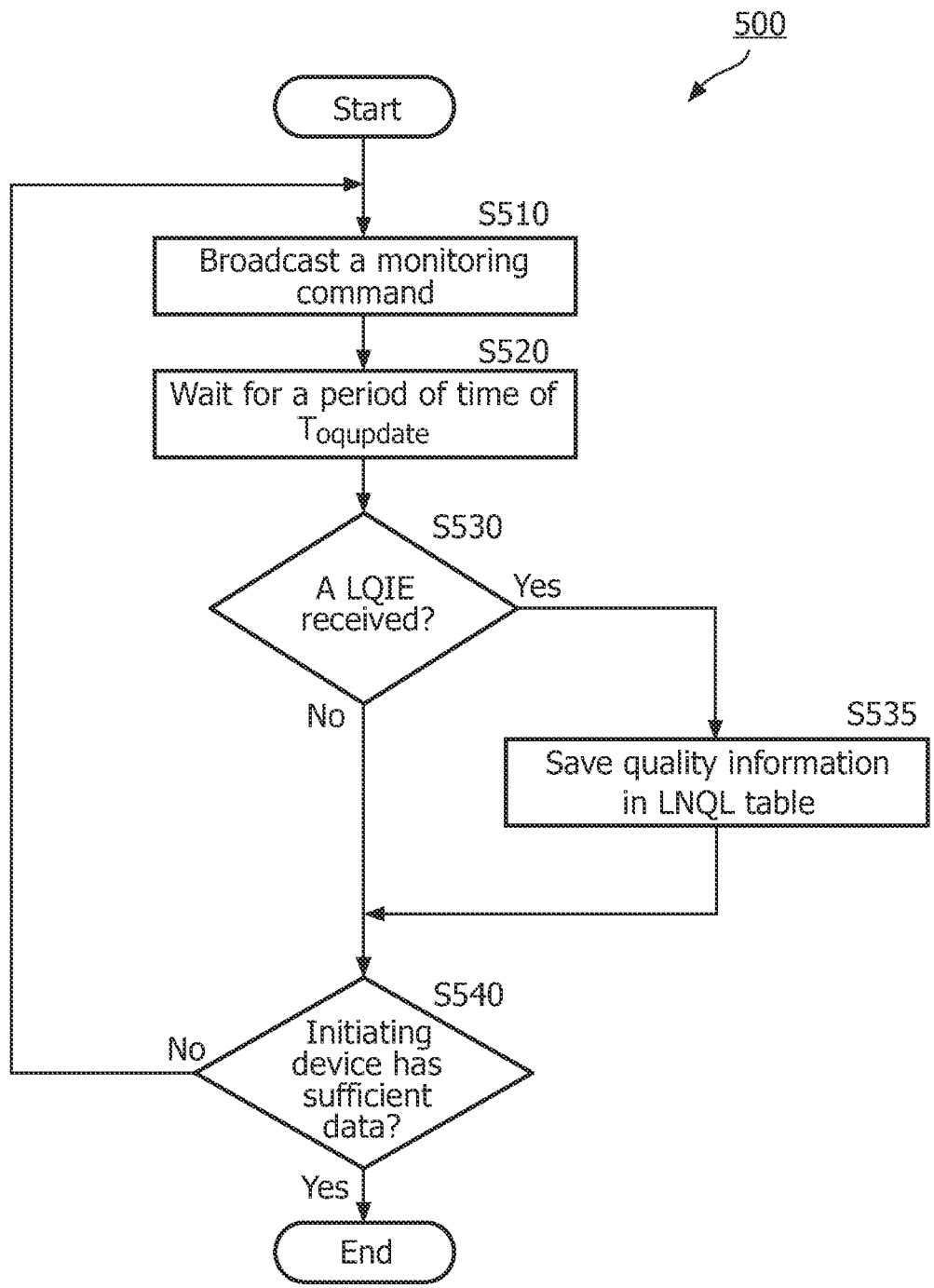
FIG. 5 is a flowchart for on-demand wireless link quality monitoring in accordance with an embodiment of the invention.

FIG. 5 shows an exemplary and non-limiting flowchart 500 describing the method for on-demand monitoring of a wireless link quality implemented in accordance with an embodiment of the invention. The method can be performed by a beaconing device or a non-beaconing device. A device initiates the on-demand process when it needs to monitor the quality of wireless links in its neighborhood. Each device is capable of measuring the quality of a link upon receiving any frames including, but not limited to, a link quality monitoring command frame, a data frame, a control frame, and so on.

The method starts at S510 where a device 110-X broadcasts a link quality monitoring command that includes a LQIE. The LQIE designates all the neighbors that the device 110-X is required to monitor. A device 110-Y receiving the monitoring command, checks if its address is specified in the received LQIE, and if so the device 110-Y responds with its LQIE that includes the quality information of wireless links between the device 110-Y and its neighbors, where only links with valid quality measurements are included. For an invalid value or unavailable measurement the respective link field maybe be set to a default value (e.g., 1111 1111)

It should be noted that the timing of the device 110-Y for transmitting the LQIE is determined by the type of the communication protocol being utilized in the wireless network. Specifically, in contention-based MAC protocols, the device 120-Y sends a LQIE frame when it gets the channel access after a successful contention. Before the transmission of a LQIE frame, the device 120-Y is assigned with a priority in the order that its address listed in the received command frame when it contends for the channel access. In reservation-based MAC protocols, the device 110-Y responds with the LQIE frame either in the order that its address is listed in the received command frame or in the order that the MAC protocol schedules the frame for transmission. It should be further noted that a device not listed in the monitoring request command can also advertise its LQIE. In such a case, the device transmits the LQIE frame at a lower priority over devices listed in the command.

At S520, the method waits a preconfigured period of time "$T_{oqupdate}$." The value of the variable $T_{oqupdate}$ may be set to a fixed value or a value computed using random distributions. Then, at S530, a check is made by the initiating device 110-X, to determine if at least one device listed in the monitoring command has responded with a LQIE frame, and if so, at S535, the LNLQ table of the device 110-X is updated to include quality information in the received LQIE frame(s); otherwise, execution continues with S540.

At S540 it is checked if the initiating device has sufficient data stored in its LNQL table, and if so execution ends; otherwise, execution continues with S510 where the method is repeated again to have complete and stable quality information of links in the neighborhood. It should be noted that the on-demand monitoring method may be repeated for a predefined number of times and then terminates.

A device can also initiate the link quality monitoring method, when the quality of some of its incoming links has changed. To this end, the device advertises the changed link quality information to devices in its neighborhood during a time period "$T_{qchange}$". The value of the variable $T_{qchange}$ is preconfigured and may be set to a fixed value or a value computed using random distributions. In one embodiment, $T_{qchange}$ variable can be set to an infinite value and as a result the LNLQ table is not updated until a device transmits a monitoring command.

The teachings of the continuous and on-demand monitoring described herein can be implemented in communication systems including, but not limited to, a UWB based wireless personal area networks (PANs), WiMedia based wireless networks, or any time division multiple access (TDMA) or super-frame based wireless networks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

I claim:

1. A method for continuous monitoring of wireless link quality of wireless links between neighboring devices in a wireless personal area network (WPAN), comprising:
   measuring the link quality of a wireless link between a beacon device transmitting a beacon and a beacon device receiving the beacon, wherein the measuring is performed by the receiving beacon device;
   broadcasting a link quality monitoring command;
   receiving, from at least one of the neighboring devices of the receiving beacon device, in response to the link quality monitoring command, link quality measures for at least one wireless link between the at least one of the neighboring devices and neighboring devices of the at least one of the neighboring devices; and
   advertising link quality measures of wireless links by transmitting the measured link quality measures and the received link quality measures in a link quality information element, LQIE, in beacons sent by the receiving beacon device.

2. The method of claim 1, wherein the link quality measures include at least one of a noise-to-signal ratio, a data transfer rate, and a receive signal strength indicator (RSSI).

3. The method of claim 2, further comprising:
   saving the link quality measures in a local neighborhood link quality (LNLQ) table maintained by the receiving beacon device, wherein the LNLQ table includes at least a device address field designating the addresses of receiving beacon devices and transmitting beacon devices, and a link quality field including the link quality measures of wireless links between respective receiving beacon devices and transmitting beacon devices designated in the device address field.

4. A method for continuous monitoring of a wireless link quality of a wireless link between neighboring devices in a wireless personal area network (WPAN), comprising:

measuring the link quality of a wireless link between a beacon device transmitting a beacon and a beacon device receiving the beacon, wherein the measuring is performed by the receiving beacon device; and advertising the link quality measures of wireless links by transmitting the measures in a link quality information element, LQIE, in beacons sent by the receiving beacon device;

wherein the LQIE is a data structure that includes at least: an element identification field, a length field, a control field, an a plurality of link fields, wherein each link field maintains the link quality measures of a wireless link between a receiving beacon device and a transmitting beacon device.

5. The method of claim 1, further comprising updating a local neighborhood link quality (LNLQ) table of a device receiving the LQIE.

6. A non-transitory computer readable medium having stored thereon computer executable code that when executed causes a processor to perform a process of monitoring of a wireless link quality of a wireless link between neighboring devices in a wireless personal area network (WPAN), the process comprising:

measuring the link quality of a wireless link between a beacon device transmitting a beacon and a beacon device receiving the beacon, wherein the measuring is performed by the receiving beacon device;

broadcasting a link quality monitoring command;

receiving, from at least one of the neighboring devices of the receiving beacon device, in response to the link quality monitoring command, link quality measures for at least one wireless link between the at least one of the neighboring devices and neighboring devices of the at least one of the neighboring devices;

saving link quality measures in a local neighborhood link quality (LNLQ) table maintained by the receiving beacon device; and advertising link quality measures of wireless links by transmitting the measured link quality measures and the received link quality measures in a link quality information element, LQIE, in beacons sent by the receiving beacon device.

7. A non-transitory computer readable medium having stored thereon computer executable code that when executed causes a processor to perform a process of monitoring of a wireless link quality of a wireless link between neighboring devices in a wireless personal area network (WPAN), the process comprising:

measuring the link quality of a wireless link between a beacon device transmitting a beacon and a beacon device receiving the beacon, wherein the measuring is performed by the receiving beacon device;

saving link quality measures in a local neighborhood link quality (LNLQ) table maintained by the receiving beacon device; and advertising the link quality measures of wireless links by transmitting the measures in a link quality information element, LQIE, in beacons sent by the receiving beacon device;

wherein the LQIE is a data structure that includes at least: an element identification field, a length field, a control field, a plurality of link fields, wherein each link field maintains the link quality measures of a wireless link between a receiving beacon device and a transmitting beacon device.

* * * * *